United States Patent
Thuries et al.

(10) Patent No.: US 6,776,342 B1
(45) Date of Patent: Aug. 17, 2004

(54) PROCESS FOR THE PARAMETERIZATION OF SCANNERS FOR ONE-DIMENSIONAL OR TWO-DIMENSIONAL PRINTED CODES

(75) Inventors: Serge Thuries, Saint Jean (FR); Jean-Louis Massieu, Montauban (FR)

(73) Assignee: Intermec IP Corp., Beverly Hills, CA (US)

( * ) Notice: Subject to any disclaimer, the term of this patent is extended or adjusted under 35 U.S.C. 154(b) by 901 days.

(21) Appl. No.: 09/127,713

(22) Filed: Jul. 29, 1998

(30) Foreign Application Priority Data

Jul. 29, 1997 (FR) .............................................. 97 09757

(51) Int. Cl.7 ................................................. G06K 7/10
(52) U.S. Cl. ................................................. 235/462.15
(58) Field of Search ........................ 235/462.01, 462.15

(56) References Cited

U.S. PATENT DOCUMENTS

| | | | | |
|---|---|---|---|---|
| 4,825,058 A | * | 4/1989 | Poland | ........................ 235/472 |
| 5,489,158 A | | 2/1996 | Wang et al. | ................ 400/103 |
| 5,777,315 A | * | 7/1998 | Wilz et al. | ................... 235/472 |
| 5,965,863 A | * | 10/1999 | Parker et al. | .......... 235/462.25 |

FOREIGN PATENT DOCUMENTS

| | | | | |
|---|---|---|---|---|
| EP | 0 700 011 A | 3/1996 | ............ G06K/7/10 |

* cited by examiner

*Primary Examiner*—Mark Tremblay
(74) *Attorney, Agent, or Firm*—Seed IP Law Group PLLC

(57) ABSTRACT

The invention concerns a process for the parameterization of scanners for printed codes, in which in a preliminary phase a coding symbology is selected, in which character strings representing parameterization commands and parameters assigned to said commands are defined, these character strings are stored and a display menu of various suggested options is established for each command and; various parameter values. Furthermore, according to this process, at the time of the parameterization of a scanner, after selection of the various commands and parameters, the selected character strings are reassembled into at least one sequence of character strings of a length at the most equal to that of the scanning range of the scanners, each of said sequences is converted to obtain the corresponding graphical symbol, and each of these symbols is read by means of the scanners.

22 Claims, 4 Drawing Sheets

| CODE A | CODE B | CODE C | VALUE |
|--------|--------|--------|-------|
| Space | Space | 00 | 0 |
| ! | ! | 01 | 1 |
| " | " | 02 | 2 |
| # | # | 03 | 3 |
| $ | $ | 04 | 4 |
| % | % | 05 | 5 |
| & | & | 06 | 6 |
| ' | ' | 07 | 7 |
| ( | ( | 08 | 8 |
| ) | ) | 09 | 9 |
| * | * | 10 | 10 |
| + | + | 11 | 11 |
| , | , | 12 | 12 |
| - | - | 13 | 13 |
| . | . | 14 | 14 |
| / | / | 15 | 15 |
| 0 | 0 | 16 | 16 |
| 1 | 1 | 17 | 17 |
| 2 | 2 | 18 | 18 |
| 3 | 3 | 19 | 19 |
| 4 | 4 | 20 | 20 |
| 5 | 5 | 21 | 21 |
| 6 | 6 | 22 | 22 |
| 7 | 7 | 23 | 23 |
| 8 | 8 | 24 | 24 |
| 9 | 9 | 25 | 25 |
| : | : | 26 | 26 |
| ; | ; | 27 | 27 |
| < | < | 28 | 28 |
| = | = | 29 | 29 |
| > | > | 30 | 30 |
| ? | ? | 31 | 31 |
| @ | @ | 32 | 32 |
| A | A | 33 | 33 |
| B | B | 34 | 34 |
| C | C | 35 | 35 |
| D | D | 36 | 36 |
| E | E | 37 | 37 |
| F | F | 38 | 38 |
| G | G | 39 | 39 |
| H | H | 40 | 40 |
| I | I | 41 | 41 |
| J | J | 42 | 42 |
| K | K | 43 | 43 |
| L | L | 44 | 44 |
| M | M | 45 | 45 |
| N | N | 46 | 46 |
| O | O | 47 | 47 |
| P | P | 48 | 48 |
| Q | Q | 49 | 49 |
| R | R | 50 | 50 |
| S | S | 51 | 51 |
| T | T | 52 | 52 |
| U | U | 53 | 53 |

*Fig. 1A*

| CODE A | CODE B | CODE C | VALUE |
|---|---|---|---|
| V | V | 54 | 54 |
| W | W | 55 | 55 |
| X | X | 56 | 56 |
| Y | Y | 57 | 57 |
| Z | Z | 58 | 58 |
| [ | [ | 59 | 59 |
| \ | \ | 60 | 60 |
| ] | ] | 61 | 61 |
| ^ | ^ | 62 | 62 |
| _ | _ | 63 | 63 |
| NUL | ` | 64 | 64 |
| SOH | a | 65 | 65 |
| STX | b | 66 | 66 |
| ETX | c | 67 | 67 |
| EOT | d | 68 | 68 |
| END | e | 69 | 69 |
| ACK | f | 70 | 70 |
| BEL | g | 71 | 71 |
| BS | h | 72 | 72 |
| HT | i | 73 | 73 |
| LF | j | 74 | 74 |
| VT | k | 75 | 75 |
| FF | l | 76 | 76 |
| CR | m | 77 | 77 |
| SO | n | 78 | 78 |
| SI | o | 79 | 79 |
| DLE | p | 80 | 80 |
| DC1 | q | 81 | 81 |
| DC2 | r | 82 | 82 |
| DC3 | s | 83 | 83 |
| DC4 | t | 84 | 84 |
| NAK | u | 85 | 85 |
| SYN | v | 86 | 86 |
| ETB | w | 87 | 87 |
| CAN | x | 88 | 88 |
| EM | y | 89 | 89 |
| SUB | z | 90 | 90 |
| ESC | { | 91 | 91 |
| FS | | | 92 | 92 |
| GS | } | 93 | 93 |
| RS | ~ | 94 | 94 |
| US | DEL | 95 | 95 |
| FNC3 | FNC3 | 96 | 96 |
| FNC2 | FNC2 | 97 | 97 |
| Shift | Shift | 98 | 98 |
| Code C | Code C | 99 | 99 |
| Code B | FNC4 | Code B | 100 |
| FNC4 | Code A | Code A | 101 |
| FNC1 | FNC1 | FNC1 | 102 |
| START [Code A] | | | 103 |
| START [Code B] | | | 104 |
| START [Code C] | | | 105 |
| STOP | STOP | STOP | |

Fig. 1B

PROCESS FOR THE PARAMETERIZATION OF SCANNERS FOR ONE-DIMENSIONAL OR TWO-DIMENSIONAL PRINTED CODES

TECHNICAL FIELD

The invention concerns a process for the parameterization of symbol readers, such as scanners for one-dimensional printed codes of the bar code type, or readers for two-dimensional printed codes of the matrix type, UPSCODE, PDF417..., intended to adapt said readers to predetermined operating conditions.

BACKGROUND OF THE INVENTION

Currently, the parameterization of printed code scanners is usually achieved by means of installation manuals containing for each data element to be formatted (scanner environment, transmission parameters, symbology parameters, operating parameters . . . ), a number of configuration codes corresponding to a predefined, current option. Furthermore, these manuals incorporate codes, each corresponding to either a number or a letter enabling on the one hand specific configuration codes not provided in said manuals to be composed and, on the other hand, character strings to be integrated into the data transmitted by the scanner.

For each scanner and for each data element to be formatted, the parameterization itself consists in reading by means of said scanner the code corresponding to the chosen option, or likewise composing by reading specific configuration codes, and possibly composing, always by reading, character strings associated with the formatted data.

Such a technique has two major drawbacks. Firstly, the method for acquiring the data to be formatted results in very long installation times and, moreover, needs to be repeated for each scanner being installed, even if the data to be formatted are identical for different scanners.

Finally, a final technique consists in using parameterization software which enables the parameterization data to be downloaded, and thus retain these data on the form of files in the downloading device. However, on the one hand any parameterization of a scanner requires it to be physically connected to the downloading device. Moreover, continuous technical development in the data processing field results in frequent replacement of hardware so that it often happens that the downloading device which was initially used, and thus the generated files, no longer exist when new parameterization is necessary.

SUMMARY OF THE INVENTION

This invention concerns itself with remedying these drawbacks and its basic objective is to supply a parameterization process for printed code scanners allowing rapid parameterization of said scanners, able to be readily repeated in an unlimited manner.

To that end, the exemplary embodiments concern a parameterization process for a printed code scanner, consisting—in a preliminary phase—of:
selecting a character coding symbology and defining in said symbology a number of character strings representing parameterization commands, and a number of parameters assigned to said commands,
storing all the character strings,
and establishing a display menu of the various suggested options for each command, and various suggested values for each parameter,
and at the time of the parameterization of a specified bar code scanner:
selecting the appropriate command and parameter for each parameterization command and each parameter possibly assigned to said command,
reassembling all the selected character strings representing the parameterization commands and the possibly assigned parameters in at least one sequence of character strings of maximum length at the most equal to the length of the scanning range of the scanner,
converting each sequence of character strings so as to obtain a corresponding graphical symbol,
editing a card containing each graphical symbol thus obtained,
and reading, by means of the scanner, each graphical symbol so as to store all the parameterization commands and possibly assigned parameters.

(It should be noted that, according to the exemplary embodiments and claims, printed code scanner is understood to mean any type of scanner, that is to say terminal devices designed specifically for code identification, or intermediate devices for the acquisition of symbols for configuring a piece of equipment, such as for example a printer which can be configured by means of said symbols).

Such a process enables a configuration card to be obtained, which is reusable at will, without requiring special storage means, and readily enabling one or more identical scanners to be parameterized, and rapidly implementing a new parameterization procedure, without risk of error, in the event of subsequent operational incident in said scanners.

Furthermore, according to this process, the edited graphical symbol or symbols are compressed in an optimum manner, so that in particular the character strings are reassembled into sequences, the number of which is merely a function of the maximum length of the scanning range of the scanner. As a result, the parameterization of a scanner necessitates the reading of only a limited number of printed codes, that is to say only one printed code.

According to another feature of the exemplary embodiments:
in the preliminary phase, a mathematical function for controlling the character strings is defined in the coding symbology,
and at the time of the parameterization, for each sequence of characters a control character representing all the characters of said sequence is calculated by means of the mathematical control function, and the calculated control character is assigned to each sequence of character strings.

According to another feature of the exemplary embodiments, a final identification character for the configuration function is assigned to each sequence of character strings.

In fact, such a final character enables the scanner to identify that the code which is read is a configuration code, and thus avoids having to switch said scanner to a programming mode.

According to a preferred way of carrying out the exemplary embodiments of the invention, set B of the 128 code is used as the coding symbology.

Furthermore, in this case the character FNC3 of said set B of the 128 code is advantageously used as the final identification character.

According to another feature of the exemplary embodiments, and in the preliminary phase, each character string is converted into binary values and all the binary values are stored.

Moreover, each character string is advantageously converted into binary values by assigning a recognition bit of said character strings representing the commands, and a recognition bit of said character strings representing the parameters.

Furthermore, for preference each binary value is coded as a hexadecimal value.

According to exemplary ways of carrying out the invention:

each binary value representing a command is coded to the base 32 by assigning a high-order recognition bit to said value.

each binary value representing a parameter is coded to the base 64 by assigning a low-order recognition bit to said value.

Furthermore, in the coding symbology of set B of the 128 code, for preference parameters representing ASCII characters are defined by selecting:

the first 31 codes of set B of the 128 code for the first 31 assigned ASCII characters of an initial recognition character, the first 63 codes of set B of the 128 code for ASCII characters 32° to 95°, and codes 32 to 63 of set B of the 128 code assigned for ASCII characters 96° to 127° of an initial recognition character.

Other features, objectives and advantages of the invention will be revealed in the detailed description below, with reference to the attached drawings which form an integral part of this description, and where:

BRIEF DESCRIPTION OF THE DRAWINGS

FIG. 1A shows one portion of the symbology of the 128 code,

FIG. 1B shows another portion of the symbology of the 128 code,

DETAILED DESCRIPTION OF THE INVENTION

Figure 2:
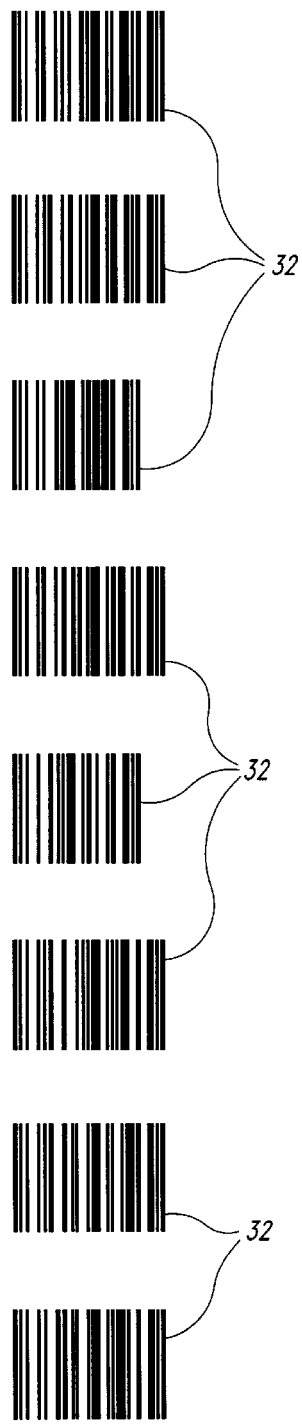
FIG. 2 shows an example of a set of configuration codes such as those currently required for the parameterization of a scanner.

The process according to the invention consists in coding the parameterization commands and the parameters which may be assigned to these commands by using set B (10) of the 128 code (12) as the coding symbology, and illustrated in FIGS. 1A and 1B.

Furthermore, all these values are stored as binary values coded as hexadecimal values.

In the first place, the parameterization commands designed to control one or more simple actions (selection and deselection of codes . . . ) are coded to the base 32 with a high-order 1 bit.

Coded in this way, 32 different codes (14) are available, the values of which, expressed to the base 32, in decimal, extend between 64 and 95, corresponding to the symbols of the equivalent values of set B (10) of the 128 code (12), and whose values expressed to the base 32, in hexadecimal, extend between 40 and 5 F.

This number of codes being insufficient, the parameterization commands will therefore be coded as 1 or 2 characters: 1 character only for the first 32 codes, and 2 characters for the following codes. As an example, the parameterization code of the order 31 thus corresponds to the value 95 (decimal value to the base 32) of set B (10) of the 128 code (12) and is coded in hexadecimal to the base 32 as the value 5 F. The parameterization code of the order 100 itself corresponds to the values 67, 68 (decimal values to the base 32) of set B (10) of the 128 code (12), and is coded in hexadecimal to the base 32 as the value 43, 44.

The parameters themselves are split into two types of parameters representing:

either numerical values (delay prior to standby mode, code lengths . . . ) being initialized by an integer from 0 to 255 for one 8-bit byte and from 0 to 65535 for two 8-bit bytes, or ASCII characters basically enabling character strings to be formed (preambles, postambles, Mark code . . . ), and being initialized for each 8-bit byte by a value from 0 to 255.

These parameters are coded to the base 64 with a low-order 1 bit in order to differentiate them from the parameterization commands.

Firstly, the parameters of numerical values are coded:

as one character for the decimal values to the base 10, from 0 to 63, whose values expressed to the base 64 in decimal correspond to the symbols of equivalent values of set B (10) of the 128 code (12), and whose values expressed to the base 64 in hexadecimal, extend between 0 and 3 F, as two or more characters for the decimal values above 63, each corresponding to one of the first 64 symbols of set B (10) of the 128 code (12), each of said characters having a value expressed to the base 64 in hexadecimal, between 0 and 3 F.

By way of an example, the numeral 5 in decimal to the base 10 thus corresponds to the value 5 (decimal value to the base 64) of set B (10) of the 128 code (12), and is coded as the value 5 in hexadecimal to the base 64.

The numeral 255 (in decimal to the base 10) is itself coded as two characters. It corresponds to the values 3 and 63, respectively, (decimal values to the base 64) of set B (10) of the 128 code (12), and is coded as the value 3, 3 F in hexadecimal to the base 64.

The parameters representing ASCII characters are intended to initialize ASCII strings, and consequently each character contained in set B (10) of the 128 code (12) constitutes one character of this ASCII string. Depending on the value of the ASCII character, different codings are applied:

to the first 31 ASCII characters corresponding to first 31 symbols of set B (10) of the 128 code (12), coded as values 0 to 1 F in hexadecimal to the base 64. Furthermore, these characters are assigned to an initial recognition character, in this case corresponding to the symbol of value 62 of set B (10) of the 128 code (12), coded as the value 3 E in hexadecimal to the base 64, to the ASCII characters from 32° to 95° corresponding to the first 63 symbols of set B (10) of the 128 code (12), coded as the values 20 to 5 F in hexadecimal to the base 64, to the ASCII characters from 96° to 128° corresponding to the symbols of values 32 to 63 of set B (10) of the 128 code (12), coded as values 60 to 7 F in hexadecimal to the base 64. Furthermore, these characters are assigned to an initial recognition character, in this case corresponding to the symbol of value 32 of set B (10) of the 128 code (12), coded as the value 20 in hexadecimal to the base 64.

Moreover, given that two recognition characters are used, these two characters are doubled at the time of their coding to enable them to be identified.

Furthermore, specific parameters can also be stored by assigning an initial recognition character to them, these parameters being designed, for example:

for keyboard key management (left shift, right shift, up, down . . . function keys), to dedicate one or more commands to a scanner identified by a parameter.

Once all the parameterization commands and any assigned parameters are defined, the process according to the invention consists in storing these data and organizing a display menu of the various options for each stored command, and various values of the parameters which may be assigned to these commands.

Figure 4:
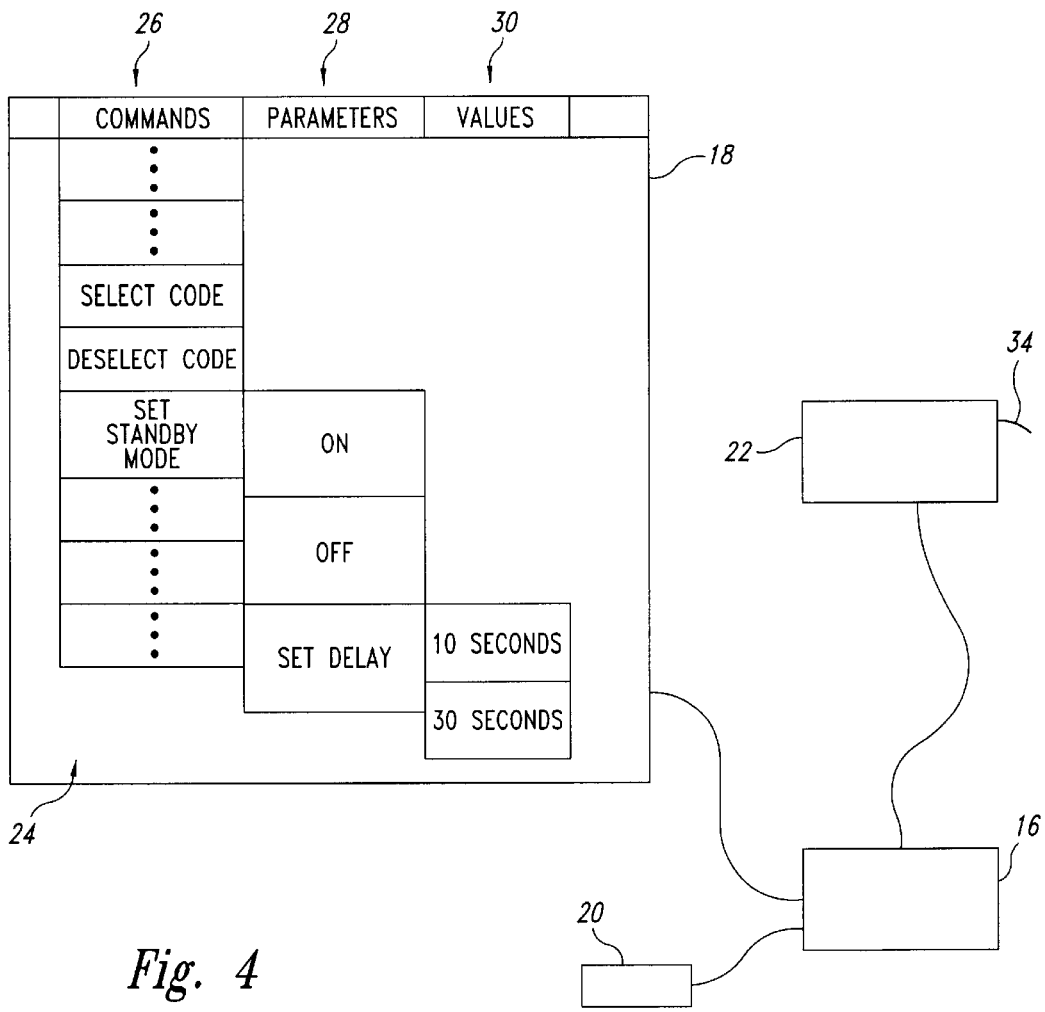
FIG. 4 shows a block diagram of an exemplary system for practicing the invention.

FIG. 4 shows an exemplary system for practicing the invention, including a programmed general purpose computer (16) having a memory (not shown), and a display (18), a user input device (20) and a printer (22) each coupled to the computer (16). Based on the detailed description of the invention provided herein, the general purpose computer (16) may readily define and store the commands and assigned parameters to the memory (not shown), and may generate the menu as an image on the display (18).

While a variety of menu formats may be employed, a pull-down menu (24) is shown in FIG. 4. A user may select the COMMANDS column (26) of the menu using the user input device (20). The user input device (20) may take the form of a mouse, trackball, touch sensitive screen, keyboard or other conventional input device. In the case of a mouse (20), the user drags down on the COMMANDS column (26), to display a list of user selectable parameterization commands. The user may drag to a PARAMETERS column (28) to display a list of parameters assigned to each of the parameterization commands. Some parameterization commands may be simple toggle switches and may therefore not have any assigned parameters. Likewise, the user may drag to a VALUES column (30) to select an appropriate value for the parameters. The menu may optionally allow the user to key in an appropriate parameter value.

At the time of the parameterization itself, the user selects the appropriate command and parameter for each parameterization command and for each parameter possibly assigned to this command, resulting in a number of corresponding character strings being obtained.

According to the exemplary embodiment, these character strings are then reassembled into at least one sequence of character strings then:

an initial character representing set B (10) of the 128 code (12) (START B character of said code) is assigned to each sequence of character strings, the control character is calculated from the mathematical function associated with the 128 code (12), and each sequence of said control characters is assigned, a final identification character is assigned to each sequence of character strings by reading the configuration mode (FNC3 character of set B (10) of the 128 code (12)), each sequence of character strings is converted to obtain a corresponding graphical symbol (32), a card (34) containing each graphical symbol (32) thus obtained is edited, for example on a printer (22).

Figure 5:
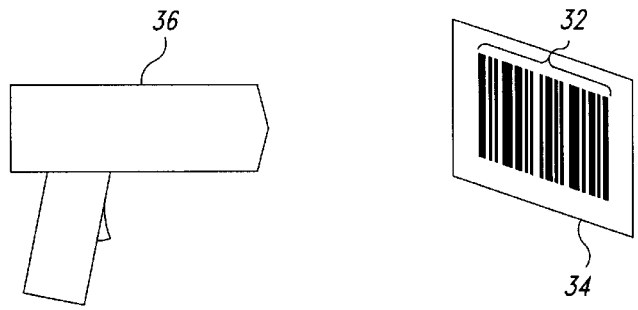
FIG. 5 shows scanner reading a configuration card.

Moreover, such a card (34), on which each graphical symbol (32) is optimally compressed, has the advantage of supplying a medium which is reusable at will and allows the parameterization of scanners (36) (FIG. 5) by simply reading the edited symbol or symbols (32).

Figure 3:
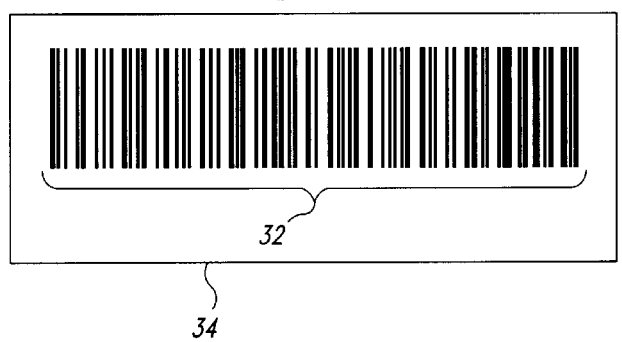
FIG. 3 shows an example of the configuration card of a scanner obtained in the process according to the invention, containing a single code incorporating all the configuration codes of FIG. 2.

As an example, FIG. 2 shows a set of configuration codes (32) such as are actually required for the parameterization of certain types of scanners (36), and FIG. 3 shows the parameterization card (34) obtained by the process according to the invention, which contains only one compressed configuration code (32) which brings together all the parameterization data shown in FIG. 2. From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A process for the parameterization of scanners for one-dimensional and two-dimensional printed codes, comprising:

defining in a character coding symbology a number of character strings representing a number of parameterization commands, a number of parameter values for one or more parameters assigned to at least one of the parameterization commands;

storing all the character strings in a computer-readable media;

establishing a display menu of the parameterization commands and the parameter values;

receiving selections for at least two of the parameterization commands and the parameter values;

assembling all the character strings representing the selected parameterization commands and the selected parameter values in at least one sequence of character strings of a maximum length at the most equal to a length of a scanning range of the scanner, where at least one of the sequences of character strings includes at least two of the character strings representing the selected parameterization commands and parameter values;

printing the assembled one sequence of character strings as a graphical symbol; and reading by means of the scanner the printed graphical symbol.

2. The process as claimed in claim 1, wherein a final identification character for the configuration function is assigned to each sequence of character strings.

3. The process as claimed in claim 1, wherein a set B of a 128 code is used as the coding symbology.

4. The process as claimed in claim 1, wherein a final identification character for the configuration function is assigned to each sequence of character strings, a set B of a 128 code is used as the coding symbology, and a character FNC3 of set B of the 128 code is used as the final identification character.

5. The process as claimed in claim 1, wherein each character string is converted into a number of binary values and all the binary values are stored.

6. The process as claimed in claim 5, wherein each character string is converted into a number of binary values by assigning a recognition bit of said character strings representing the commands, and a recognition bit of said character strings representing the parameters.

7. The process as claimed in claim 6, wherein each of the binary values is coded as a hexadecimal value.

8. The process as claimed in claim 7, wherein each of the binary values represents a command coded to the base 32 by assigning a high-order recognition bit to said value.

9. The process as claimed in claim 7, wherein each of the binary values represents a parameter coded to the base 64 by assigning a low-order recognition bit to said value.

10. The process as claimed in claim 3, wherein in the coding symbology of the set B of the 128 code, parameters representing ASCII characters are defined by selecting:

the first 31 codes of the set B of the 128 code for the first 31 ASCII characters assigned to a recognition character, the first 63 codes of the set B of the 128 code for ASCII characters 32 to 95, and codes 32 to 63 of the set B of the 128 code for ASCII characters 96 to 127 assigned to a recognition character.

11. A method for configuring a symbology reader, comprising:

receiving a number of scanner commands and scanner parameter values selected from a computer display menu of commands and parameter values;

generating a graphic from at least two of the selected commands and parameters, the graphic having a maximum length at the most equal to the length of the scanning range of the symbol reader; and scanning the graphic with the symbol reader.

12. The method of claim 11 wherein generating a graphic comprises:

associating each of the selected scanner commands with a character string.

13. The method of claim 11 wherein generating a graphic comprises:

associating each of the selected scanner parameter values with a character string.

14. The method of claim 11 wherein generating a graphic comprises:

associating each of the selected scanner commands with a respective character string;

associating each of the selected scanner parameter values with a respective character string;

converting the respective character strings into a graphic.

15. The method of claim 11 wherein generating a graphic comprises:

associating each of the selected scanner commands with a respective character string;

associating each of the selected scanner parameter values with a respective character string;

converting the respective character strings into a bar code symbol; and printing the bar code symbol.

16. A method of configuring a system for producing a symbol, comprising:

assigning a respective character string to each of a number of commands for a symbol reader;

assigning a respective character string to each of a number of parameter values for a symbol reader;

generating a computer interface menu of user selectable commands and parameter values; and logically associating the user selectable commands and parameter values with the respective character strings.

17. The method of claim 16, further comprising:

logically associating the respective character strings with symbol characters.

18. A method of producing a symbol reader graphic, comprising selecting a number of symbol reader commands and symbol reader parameters from a graphical user interface menu;

associating the selected symbol reader commands and symbol reader parameter values with a number of character strings; and converting the character strings into a graphic.

19. The method of claim 18 wherein converting the character strings comprises:

translating the character strings into symbol characters; and printing the symbol characters on a medium.

20. The method of claim 18 wherein converting the character strings comprises:

translating the character strings into a compressed symbol including at least two of the character strings representing the selected parameterization commands and parameter values where the compressed symbol has a maximum length at the most equal to a length of a scanning range of the scanner; and printing the compressed symbol on a medium.

21. The method of claim 18, further comprising:

scanning the graphic with a symbol reader.

22. An apparatus for producing a symbol reader configuration symbol, comprising:

means for assigning a respective character string to each of a number of commands for a symbol reader;

means for assigning a respective character string to each of a number of parameters for a symbol reader;

means for generating a computer interface menu of user selectable commands and parameter values; and means for logically associating the selectable commands and parameter values with the respective character strings.

* * * * *